United States Patent
Haubruge et al.

(10) Patent No.: US 8,283,426 B2
(45) Date of Patent: Oct. 9, 2012

(54) FIBRES AND NONWOVEN PREPARED FROM POLYPROPYLENE HAVING A LARGE DISPERSITY INDEX

(75) Inventors: Hugues Haubruge, Walhain (BE); Guillaume Pavy, Brussels (BE); Alain Standaert, Brussels (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 0 days.

(21) Appl. No.: 12/918,102

(22) PCT Filed: Feb. 20, 2009

(86) PCT No.: PCT/EP2009/052081
§ 371 (c)(1),
(2), (4) Date: Jan. 27, 2011

(87) PCT Pub. No.: WO2009/103810
PCT Pub. Date: Aug. 27, 2009

(65) Prior Publication Data
US 2011/0184136 A1   Jul. 28, 2011

(30) Foreign Application Priority Data
Feb. 22, 2008 (EP) .................................. 08151829

(51) Int. Cl.
*C08F 4/649* (2006.01)
*C08F 8/50* (2006.01)
*D04H 3/16* (2006.01)
*C08F 10/06* (2006.01)

(52) U.S. Cl. ............... 526/124.9; 526/125.3; 526/348.1; 525/333.8; 525/938; 156/167

(58) Field of Classification Search ............... 526/124.9, 526/348.1, 125.3; 156/167; 525/333.8, 938
See application file for complete search history.

(56) References Cited

U.S. PATENT DOCUMENTS

| | | | |
|---|---|---|---|
| 5,431,994 A | 7/1995 | Kozulla | |
| 5,468,704 A * | 11/1995 | Morini et al. | 502/115 |
| 5,529,850 A | 6/1996 | Morini et al. | |
| 5,882,562 A * | 3/1999 | Kozulla | 264/83 |
| 2006/0057374 A1 * | 3/2006 | Sartori et al. | 428/364 |
| 2006/0137808 A1 * | 6/2006 | Bornmann et al. | 156/167 |
| 2006/0154064 A1 * | 7/2006 | Sartori et al. | 428/374 |

FOREIGN PATENT DOCUMENTS

WO    03/040442    5/2003

OTHER PUBLICATIONS

International Search Report for International Application No. PCT/EP2009/052081, mailed on Apr. 17, 2009 (2 pages).

* cited by examiner

*Primary Examiner* — Fred M Teskin

(57) ABSTRACT

The present invention relates to a process for the production of fibers and filaments with polypropylene having a broad polydispersity index. The present invention also relates to high elongation nonwoven prepared from such fibers and filaments. It further relates to films and laminates prepared from high elongation nonwoven.

10 Claims, No Drawings

FIBRES AND NONWOVEN PREPARED FROM POLYPROPYLENE HAVING A LARGE DISPERSITY INDEX

CROSS-REFERENCE TO RELATED APPLICATIONS

This application claims the benefit of PCT/EP2009/052081, filed Feb. 20, 2009, which claims priority from EP 08151829.2, filed Feb. 22, 2008.

The present invention relates to a process for the production of fibres and filaments with polypropylene having a large polydispersity index. The present invention also relates to high elongation nonwoven prepared from such fibres and filaments. It further relates to laminates prepared from high elongation nonwoven.

Polypropylene is one of the most widely used polymers in fibres and nonwoven. Due to its versatility and its good mechanical and chemical properties, polypropylene is well suited to fulfill requirements in many different applications. Polypropylene fibres and nonwoven are for example used in the construction and agricultural industries, sanitary and medical articles, carpets, and textiles.

The polypropylenes used for fibres and nonwoven have a melt flow that can range from 5 dg/min up to several thousands dg/min, depending upon the production method, final use etc.. For very strong high-tenacity fibers, the lower part of the range is preferred whereas for meltblown nonwoven, the higher part of the range is preferred. Typically, polypropylene used in fibre extrusion has a melt flow in the range of from 5 dg/min to about 40 dg/min. Polypropylene used for spunbond nonwoven typically has a melt flow index in the range of from 25 dg/min to 40 dg/min and is additionally characterised by a narrow molecular weight distribution (Polypropylene Handbook, ed. Nello Pasquini, $2^{nd}$ edition, Hanser, 2005, p. 397).

Polypropylene is generally produced by the polymerisation of propylene and one or more optional comonomers in presence of a Ziegler-Natta catalyst, i.e. a transition metal coordination catalyst, specifically a titanium halide containing catalyst. These catalysts in general also contain internal electron donors, such as phthalates, diethers, or succinates. Polypropylene produced by Ziegler-Natta catalysis can be directly used without modification for the production of fibres.

However, in order to improve the processability and the nonwoven properties in spunbond nonwoven the molecular weight distribution of the polypropylene often needs to be narrowed, which can be done either thermally or chemically by post-reactor degradation.

Research Disclosure RD 36347, for example, discloses the use of a polypropylene degraded from a starting melt flow of 1 dg/min to a final melt flow of 20 dg/min in the production of a spunbond nonwoven. The degraded polypropylene has a molecular weight distribution in the range from 2.1 to 2.6.

Whilst not wishing to be bound by theory it is believed that under the processing conditions used in the production of a spunbond nonwoven, the narrowing of the molecular weight distribution also reduces the melt elasticity, which in turn results in a reduction of die swell and in reduced resistance to fibre drawing. Thus, the stability of the spinning process as well as the maximum spinning speed are increased. Additionally, a polypropylene of narrow molecular weight distribution is more likely to retain orientation and good mechanical properties of the nonwoven.

There remains however a constant demand for further improvement such as for example improved constant elongation and partial elastic recovery.

It is an aim of the present invention to prepare fibres and filaments having excellent elongation.

It is also an aim of the present invention to prepare fibres and filaments having good strength.

It is a further aim of the present invention to prepare fibres and filaments having partial elastic recovery.

It is yet a further aim of the present invention to prepare nonwovens with high elongation and good tear resistance.

It is another aim of the present invention to prepare fibres with stable spinnability.

Any one of these aims is at least partially fulfilled by the present invention.

Accordingly, the present invention discloses fibres and filaments prepared from a polypropylene having a molecular weight distribution of 7 or more, wherein the polypropylene is prepared with a Ziegler-Natta catalyst system including an internal electron donor comprising at least 80 wt % of a compound selected from the group consisting of succinates, di-ketones and enamino-imines or blends of these.

Further, the present invention provides a process for the production of fibers and filaments, said process comprising the steps of (a) polymerizing propylene and one or more optional comonomers in presence of
   (i) a Ziegler-Natta catalyst, and
   (ii) an organoaluminium compound,
   to produce a polypropylene having a molecular weight distribution $M_w/M_n$ of at least 7;

(b) feeding the polypropylene from the previous step to an extruder;

(c) subsequently melt-extruding the polypropylene to obtain a molten polypropylene stream;

(d) extruding the molten polypropylene stream of step (c) through a number of fine, usually circular, capillaries of a spinneret, thus obtaining filaments of molten polypropylene; and (e) subsequently rapidly reducing the diameter of the filaments obtained in the previous step to a final diameter, wherein the polypropylene produced in step (a) is either a propylene homopolymer or a random copolymer of propylene with one or more comonomers, said comonomers being ethylene or a $C_4$-$C_{10}$ alpha-olefin, said random copolymer comprising up to 6% by weight of comonomer, relative to the total weight of the random copolymer; and wherein the Ziegler-Natta catalyst comprises a titanium compound, which has at least one titanium-halogen bond, and an internal donor, both supported on a magnesium halide in active form, with the internal donor comprising at least 80 wt %, with respect to the total weight of the internal donor, of a compound selected from the group consisting of succinates, di-ketone, enamino-imines or blends of these.

Furthermore, the present invention provides for the use of the fibers and filaments produced according to the above process in agricultural sheets, building sheets, underroofing covers or geotextiles.

Finally, the present invention also provides for the use of a polypropylene in order to prepare high elongation fibers and filaments, wherein the polypropylene is either a propylene homopolymer or a random copolymer of propylene with one or more comonomers, said comonomers being ethylene or a $C_4$-$C_{10}$ alpha-olefin, said random copolymer comprising up to 6% by weight of comonomer, relative to the total weight of the random copolymer; and wherein the polypropylene has a molecular weight distribution of at least 7; and wherein the polypropylene is produced by polymerizing propylene and one or more optional comonomers in presence of
(i) a Ziegler-Natta catalyst, and
(ii) an organoaluminium compound; and
wherein the Ziegler-Natta catalyst comprises a titanium compound, which has at least one titanium-halogen bond, and an internal donor, both supported on a magnesium halide in active form, with the internal donor comprising at least 80 wt %, with respect to the total weight of the internal donor, of a compound selected from the group consisting of succinates, di-ketone, enamino-imines or blends of these.

For easier understanding the terms "succinate catalyst", "diether catalyst" and "phthalate catalyst" are used to denote a Ziegler-Natta catalyst with a succinate compound as internal electron donor, resp. a Ziegler-Natta catalyst with a diether compound as internal electron donor, resp. a Ziegler-Natta catalyst with a phthalate compound as internal electron donor.

Propylene homo- and copolymers are produced in the presence of
(a) a Ziegler-Natta catalyst comprising a titanium compound, which has at least one titanium-halogen bond, and an internal electron donor, both supported on a magnesium halide in active form,
(b) an organoaluminium compound, such as an aluminium alkyl compound, and
(c) an optional external electron donor (ED).

The Ziegler-Natta catalyst comprises a titanium compound, which has at least one titanium-halogen bond, and an internal donor, both supported on magnesium halide in active form.

The internal donor used in the present invention is a succinate, a di-ketone, an enamino-imine or a blend of these, or a blend of these with a different internal donor, such as for example a phthalate or a diether, provided that such a mixture shows polymerisation behaviour comparable to a Ziegler-Natta catalyst with a succinate, a di-ketone, an enamino-imine, or a blend of these as internal donor. A mixture of internal donors could for example comprise a succinate and a phthalate or a mixture of a succinate and a diether. The preferred internal donor is a succinate or a mixture of a succinate and a diether.

Alternatively to a Ziegler-Natta catalyst comprising a mixture of internal donors as described above it is also possible to employ a mixture of a Ziegler-Natta catalyst with a succinate, a di-ketone, an enamino-imine, or a blend of these as internal donor, and a Ziegler-Natta catalyst with a different internal donor. For example, it is possible to employ a mixture of a succinate catalyst and a diether catalyst or a mixture of a succinate catalyst and a phthalate catalyst.

Independently of whether one Ziegler-Natta catalyst with a mixture of internal donors or a mixture of Ziegler-Natta catalysts, each with a different electron donor, is used, the internal donors selected from the group consisting of succinates, di-ketones or enamino-imines comprise at least 80 wt %, preferably at least 90 wt %, more preferably at least 95 wt % and even more preferably at least 99 wt % of the total weight of the internal donor. It is, however, most preferred that the internal donor is a succinate, an enamino-imine or a di-ketone, i.e. that the internal donor is not a blend. It is most preferred that the internal donor consists essentially of a succinate, for example that at least 99.5 wt % of the total weight of the internal donor is a succinate.

Ziegler-Natta catalysts comprising a succinate, a di-ketone or an enamino-imine as internal donor can for example be obtained by reaction of an anhydrous magnesium halide with an alcohol, followed by titanation with a titanium halide and reaction with the respective succinate, di-ketone or enamino-imine compound as internal donor. Such a catalyst comprises about 2-6 wt % of titanium, about 10-20 wt % of magnesium and about 5-30 wt % of internal donor with chlorine and solvent making up the remainder.

Suitable succinate compounds have the formula

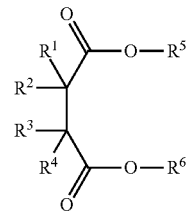

wherein $R^1$ to $R^4$ are each independently selected from hydrogen, or a $C_1$-$C_{20}$ linear or branched alkyl, alkenyl, cycloalkyl, aryl, arylalkyl or alkylaryl group, optionally containing heteroatoms, and $R^1$ to $R^4$, being joined to the same carbon atom, can be linked together to form a cycle; and $R^5$ and $R^6$ are independently selected from a linear or branched alkyl, alkenyl, cycloalkyl, aryl, arylalkyl or alkylaryl group, optionally containing heteroatoms.

Suitable di-ketones are 1,3-di-ketones of formula

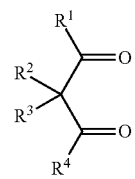

wherein $R^2$ and $R^3$ are each independently selected from hydrogen, or a C1-C20 linear or branched alkyl, alkenyl, cycloalkyl, aryl, arylalkyl or alkylaryl group, optionally containing heteroatoms, and $R^2$ and $R^3$, being joined to the same carbon atom, can be linked together to form a cycle; and $R^1$ and $R^4$ are each independently selected from a linear or branched alkyl, alkenyl, cycloalkyl, aryl, arylalkyl or alkylaryl group, optionally containing heteroatoms.

Suitable enamino-imines have the general formula

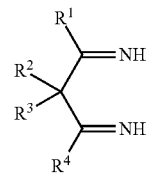

wherein $R^2$ and $R^3$ are each independently selected from hydrogen, or a C1-C20 linear or branched alkyl, alkenyl, cycloalkyl, aryl, arylalkyl or alkylaryl group, optionally containing heteroatoms, and $R^2$ and $R^3$, being joined to the same carbon atom, can be linked together to form a cycle; and $R^1$ and $R^4$ are each independently selected from a linear or branched alkyl, alkenyl, cycloalkyl, aryl, arylalkyl or alkylaryl group, optionally containing heteroatoms.

In the polymerization process of the present invention the external electron donor (ED) is optional. It is nevertheless preferred to perform the polymerisation in presence of an external electron donor (ED). Suitable external electron donors (ED) include certain silanes, ethers, esters, amines, ketones, heterocyclic compounds and blends of these. It is preferred to use a 1,3-diether as described above or a silane. It is most preferred to use silanes of the general formula $$R^a_p R^b_q Si(OR^c)_{(4-p-q)}$$

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl) Si(OCH$_3$)$_2$ (referred to as "C donor"), (phenyl)$_2$Si(OCH$_3$)$_2$ and (cyclopentyl)$_2$ Si(OCH$_3$)$_2$ (referred to as "D donor").

The organoaluminium compound used in the process of the present invention is triethyl aluminium (TEAL). Advantageously, the triethyl aluminium has a hydride content, expressed as AlH$_3$, of less than 1.0 wt % with respect to the triethyl aluminium. More preferably, the hydride content is less than 0.5 wt %, and most preferably the hydride content is less than 0.1 wt %. It would not depart from the scope of the invention if the organoaluminium compound contains minor amounts of other compounds of the trialkylaluminium family, such as triisobutyl aluminium, tri-n-butyl aluminium, and linear or cyclic alkyl aluminium compounds containing two or more Al atoms, provided they show polymerisation behaviour comparable to that of TEAL.

In the process of the present invention the molar ratio Al/Ti preferably is at most 40, more preferably it is in the range from 10 to 40, and most preferably it is in the range from 15 to 35.

If an external electron donor (ED) is present, the molar ratio Al/ED preferably is at most 250, most preferably it is in the range from 5 to 200.

Before being fed to the polymerisation reactor the catalytic system preferably undergoes a premix and/or a pre-polymerisation step. In the premix step, the triethyl aluminium (TEAL) and the external electron donor (ED), if present, which have been pre-contacted, are mixed with the Ziegler-Natta catalyst at a temperature in the range from 0° C. to 30° C., preferably in the range from 5° C. to 20° C., for up to 15 min. The mixture of TEAL, external electron donor and Ziegler-Natta catalyst is pre-polymerised with propylene at a temperature in the range from 10° C. to 100° C., preferably in the range from 10° C. to 30° C., for 1 to 30 min, preferably for 2 to 20 min.

The polymerisation of propylene and one or more optional comonomers can be carried out according to known techniques. The polymerisation can for example be carried out in liquid propylene as reaction medium. It can also be carried out in a diluent, such as a hydrocarbon that is inert under polymerisation conditions (slurry polymerisation). It can also be carried out in the gas phase.

For the present invention propylene homopolymers and random copolymers are preferably produced by polymerisation in liquid propylene at temperatures in the range from 20° C. to 100° C. Preferably, temperatures are in the range from 60° C. to 80° C. The pressure can be atmospheric or higher. Preferably the pressure is between 25 and 50 bar.

Hydrogen is used to control the chain lengths of the propylene polymers. For the production of propylene polymers with high MFI, i.e. with low average molecular weight and short polymer chains, the concentration of hydrogen in the polymerisation medium needs to be increased. Inversely, the hydrogen concentration in the polymerization medium has to be reduced in order to produce propylene polymers with low MFI, i.e. with high average molecular weight and long polymer chains.

For the present invention the production of the propylene polymers can be carried out in one single polymerisation reactor, which with the polymerisation catalysts used in the present invention leads to a broad molecular weight distribution.

Alternatively, the production of the propylene polymers can be carried out in two or more sequential polymerisation reactors, i.e. two or more polymerisation reactors in series, wherein the propylene polymer produced in each of the two or more sequential polymerisation reactors has a different average molecular weight In practice, the production of propylene polymers having different average molecular weight may be achieved by having different hydrogen concentrations in the polymerisation media in each of the at least two polymerisation reactors.

The polypropylene that can be used in the present invention is either a homopolymer or a random copolymer of propylene with one or more comonomers, said comonomer being ethylene or a $C_4$-$C_{10}$ alpha-olefin, such a butene-1, pentene-1, hexene-1, octene-1, 4-methyl-pentene-1. The preferred comonomers are ethylene and butene-1. The most preferred comonomer is ethylene.

The random copolymer of the present invention comprises at most 6% by weight, preferably at most 5% by weight and most preferably at most 3% by weight of comonomer. Preferably, the random copolymer of the present invention comprises at least 0.1% by weight, more preferably at least 0.2% by weight and most preferably at least 0.5% by weight of comonomer.

In the present invention the polypropylene has a molecular weight distribution $M_w/M_n$ of at least 7, ex-reactor, with $M_n$ being the number average molecular weight and $M_w$ being the weight average molecular weight. Molecular weights can for example be determined by size exclusion chromatography (SEC) as described in the example. More preferably the polypropylene of the present invention has a molecular weight distribution $M_w/M_n$ of at least 8, ex reactor. The choice of internal donor determines the polydispersity index. The term "ex-reactor" is used to indicate that the polypropylene has not undergone any post-reactor treatment to change its molecular weight distribution.

The polypropylene of the present invention is characterised by a melt flow index in the range from 1 to 2000 dg/min, as measured according to ISO 1133, condition L, at a temperature of 230° C. under a load of 2.16 kg. When used for fibre spinning the melt flow of the polypropylene is in the range from 5 dg/min to 40 dg/min. When used in the spunbonding process the melt flow of the polypropylene is of at least 10 dg/min, preferably at least 12, 14, 16, 18 or 20 dg/min. When used in the spunbonding process the melt flow of the polypropylene is at most 300 dg/min, preferably at most 200 dg/min, more preferably at most 150 dg/min, even more preferably at most 100 dg/min and most preferably at most 60 dg/min. When used in the melt blown process the melt flow of the metallocene polypropylene is of at least 100 dg/min, preferably at least 150 dg/min, more preferably at least 200 dg/min, even more preferably at least 250 dg/min and most preferably at least 300 dg/min. When used in the melt blown process the melt flow of the polypropylene is of at most 2000 dg/min, preferably at most 1800 dg/min, more preferably at most 1600 dg/min, and most preferably at most 1400 dg/min.

The polypropylene of the present invention, prepared with a succinate internal electron donor, is characterised by a high isotacticity, of which the content of mmmm pentads is a measure. The content of mmmm pentads is at least 90% preferably at least 92%, 94%, 95%, 96% or 97%. The isotacticity is determined by $^{13}$C-NMR analysis as described in the examples.

The polypropylene fibres and filaments of the present invention are produced by methods well known to the skilled person. Polypropylene is melted in an extruder, preferably passed through a melt pump to ensure a constant feeding rate and then extruded through a number of fine capillaries of a spinneret. The still molten fibres and filaments are simultaneously cooled by air, drawn to a final diameter and collected. They are for example collected on a winder or other suitable collecting means. Preferably, no further drawing step is conducted with the so-obtained fibres and filaments, i.e. they are produced "as-spun".

The present invention also provides a process for the production of fibres and filaments, said process comprising the steps of:
(a) providing a polypropylene resin having a polydispersity index of at least 7,
(b) feeding the polypropylene of the previous step to an extruder,
(c) subsequently melt-extruding the polypropylene to obtain a molten polypropylene stream,
(d) extruding the molten polypropylene stream of step (c) from a number of fine, usually circular, capillaries of a spinneret, thus obtaining filaments of molten polypropylene, and
(e) subsequently rapidly reducing the diameter of the filaments obtained in the previous step to a final diameter.

The fibres and filaments of the present invention may be multicomponent fibres or filaments. Preferably they are bicomponent fibres or filaments. Bi- or multi-component fibres or filaments are known in many different configurations, such as for example side-by-side, sheath-core, islands-in-the-sea, pie or stripe configurations. Bi- or multi-component fibres or filaments can be formed by co-extrusion of at least two different components into one fibre or filament. This is done by feeding the different components to a corresponding number of extruders and combining the different melts into a single fibre or filament. The resulting fibre or filament has at least two different essentially continuous polymer phases. Such fibres or filaments, their production as well as their forming a nonwoven are well known to the skilled person and are for example described in F. Fourné, Synthetische Fasern, Carl Hanser Verlag, 1995, chapter 5.2 or in B. C. Goswami et al., Textile Yarns, John Wiley & Sons, 1977, p. 371-376.

The present invention also discloses a process for the production of multicomponent as-spun fibres and filaments, said process comprising the steps of
(a) providing a first polypropylene resin having a polydispersity index of at least 7;
(a2) providing at least one further thermoplastic polymer;
(b') feeding the polypropylene of step (a) and the at least one further thermoplastic polymer of step (b) to separate extruders;
(c') consecutively melt-extruding the polypropylene and the at least one further resin or blend to obtain a molten polymer stream from each extruder;
(d') co-extruding the molten polymer streams of step d) from a number of fine capillaries of a spinneret, thus obtaining multicomponent filaments of molten polymer, and
(e) subsequently rapidly reducing the diameter of the filaments obtained in the previous step to a final diameter.

The nonwovens of the present invention may be produced by any suitable method. The preferred methods are the spunbonding process and the melt blown process. Of these the spunbonding process is the most preferred. In the spunbonding process as well as in the melt blown process the extruded fibres and filaments are drawn in the molten state only. For the purpose of the present invention the fibres and filaments comprised in a spunbond nonwoven or a melt blown nonwoven are therefore considered to be as-spun fibres and filaments.

In the spunbonding process, the polypropylene is melted in an extruder, preferably first passed through a melt pump to ensure a constant feeding rate and then extruded from a number of fine, usually circular, capillaries of a spinneret, thus obtaining filaments. The filament formation can either be done by using one single spinneret with a large number of holes, typically several thousands, or by using several small spinnerets with a much lower number of holes per spinneret. After exiting from the spinneret, the still molten filaments are quenched by a current of air. The diameter of the filaments is then quickly reduced by a flow of high-pressure air. Air velocities in this drawdown step can range up to several thousand meters per minute.

After drawdown the nonwoven is prepared by collecting the filaments on a support, for example a forming wire or a porous forming belt, thus first forming an unbonded web, which is then passed through compaction rolls and finally through a bonding step. Bonding of the fabric may be accomplished by thermobonding, hydroentanglement, needle punching, or chemical bonding.

Thus, the present invention provides a process for the production of fibres and filaments, said process further comprising the steps of
(f) collecting the filaments obtained in step (e) on a support, and
(g) subsequently bonding the collected filaments to form a bonded nonwoven.

In the melt blown process, the polypropylene composition is melted in an extruder, preferably first passed through a melt pump to ensure a constant feeding rate and then through the capillaries of a special melt blowing die. Usually melt blown dies have a single line of usually circular capillaries through which the molten polymer passes. After exiting from the die, the still molten filaments are first contacted with hot air at high speed, which rapidly draws the fibres. They are then contacted with cool air that solidifies the filaments. The nonwoven is formed by depositing the filaments directly onto a forming wire or a porous forming belt.

Composites may be formed from two or more nonwovens, of which at least one is made in accordance with the present invention. In particular, the composites comprise a spunbond nonwoven layer (S) according to the present invention or a melt blown nonwoven layer (M) according to the present invention. Composites in accordance with the present invention can for example be SS, SSS, SMS, SMMSS or any other combination of spunbond and melt blown nonwoven layers. In a preferred embodiment according to the present invention, the polypropylene resin of the present invention is used in the sheath of a concentric bicomponent configuration.

A first nonwoven or composite, said first nonwoven or composite being in accordance with the present invention, and a film may be combined to form a laminate. The film preferably is a polyolefin film. The laminate is formed by bringing the first nonwoven or composite and the film together and laminating them to one another for example by passing them through a pair of lamination rolls. The laminates may further include a second nonwoven or composite, which can be, but need not be, according to the present invention, on the face of the film opposite to that of the first nonwoven or composite. In a preferred embodiment, the film of the laminate is a breathable polyolefin film, thus resulting in a laminate with breathable properties. Thus, the present invention provides a process for the production of fibres and filaments, said process further comprising the step of (h) laminating a film to the bonded nonwoven obtained in step (g).

Preferably, the polypropylene used to produce the fibers and filaments in accordance with the present invention is either thermally or chemically degraded after it is removed from the polymerization reactor. More preferably, it is chemically degraded (visbroken). For chemical degradation the polypropylene is molten and brought into intimate contact with a peroxide (for example 2,5-dimethylhexane-2,5-di-tertbutylperoxide) leading to the generation of radicals which in turn lead to a breakdown of the polymer chains. Thus, the melt flow index of the polypropylene increases from a first melt flow index $MFI_1$ before degradation to a second melt flow index $MFI_2$ after degradation. As a consequence of the longer polymeric chains being preferentially attacked by the radicals for statistical reasons, the molecular weight distribution narrows. Visbreaking of polypropylene is usually carried out at temperatures in the range from 200° C. to 250° C. It can for example be done in the extruder in the granulation step of a polypropylene manufacturing plant. Alternatively, it can be done it the melt-extruding step as part of the process for the production of fibers and filaments.

The extent to which a polypropylene has been degraded can be described with the degradation ration, which is the ratio $MFI_2/MFI_1$, i.e. the ratio between the second melt flow index $MFI_2$ after degradation and the first melt flow index $MFI_1$ before degradation. Preferably, the polypropylene used in the present invention has a degradation ratio $MFI_2/MFI_1$ of at least 2, more preferably of at least 3 and most preferably of at least 4. Preferably, the polypropylene used in the present invention has a degradation ratio of at most 100, more preferably of at most 50, even more preferably of at most 30 and most preferably of at most 20. The melt flow index is measured according to ISO 1133 at 230° C. and 2.16 kg.

The present invention is particularly useful in the preparation of high elongation nonwovens and nonwoven laminates. These nonwovens and laminates are very useful in applications where elongation and tear resistance are required such as for example agricultural sheets that are laid over the fields and stretch easily to absorb plant growth. They are also useful in building sheets, in underroofing covers, and in geotextile applications.

The fibres and filaments prepared according to the present invention are characterised by a very long elongation. The elongation at break measured on fibres, is up to 20%, preferably 50%, and more preferably 100% larger than that of equivalent fibres or filaments prepared with a polypropylene resin produced with a Ziegler-Natta catalyst system including another internal electron donor than succinate, even if said polypropylene resin is visbroken.

The present invention therefore also provides for the use of a polypropylene as defined in the present invention for the preparation of high elongation fibers and filaments.

The polypropylene of the present invention may also contain additives such as, by way of example, antioxidants, light stabilisers, acid scavengers, lubricants, antistatic additives, and colorants.

EXAMPLES

The melt flow index was measured according to norm ISO 1133, condition L, using a weight of 2.16 kg and a temperature of 230 ° C.

Molecular weights were determined by Size Exclusion Chromatography (SEC) at high temperature (145° C.). A 10 mg PP sample was dissolved at 160° C. in 10 ml of trichlorobenzene (technical grade) for 1 hour. The analytical conditions for the Alliance GPCV 2000 from WATERS were:
Volume: +/−400 µl
Injector temperature: 140° C.
Column and detector: 145° C.
Column set: 2 Shodex AT-806MS and 1 Styragel HT6E
Flow rate 1 ml/min
Detector: Refractive index
Calibration: Narrow standards of polystyrene
Calculation: Based on Mark-Houwink relation ($\log(M_{PP})$ =$\log(M_{PS})$−0.25323)

Xylene solubles (XS) were determined as follows: Between 4.5 and 5.5 g of propylene polymer were weighed into a flask and 300 ml xylene were added. The xylene was heated under stirring to reflux for 45 minutes. Stirring was continued for 15 minutes exactly without heating. The flask was then placed in a thermostated bath set to 25° C. +/−1° C. for 1 hour. The solution was filtered through Whatman n° 4 filter paper and exactly 100 ml of solvent were collected. The solvent was then evaporated and the residue dried and weighed. The percentage of xylene solubles ("XS"), i.e. the percentage of the xylene soluble fraction, was then calculated according to XS (in wt %)=(Weight of the residue/Initial total weight of PP)*300 with all weights being in the same unit, such as for example in grams.

The isotacticity was determined by $^{13}$C-NMR analysis on the total polymer. In the spectral region of the methyl groups the signals corresponding to the pentads mmmm, mmmr, mmrr and mrrm were assigned using published data, for example A. Razavi, Macromol. Symp., vol. 89, pages 345-367. Only the pentads mmmm, mmmr, mmrr and mrrm were taken into consideration due to the weak intensity of the signals corresponding to the remaining pentads. For the signal relating to the mmrr pentad a correction was performed for its overlap with a methyl signal related to 2,1-insertions. The percentage of mmmm pentads was then calculated according to % mmmm=$AREA_{mmmm}/(AREA_{mmmm}+AREA_{mmmr}+AREA_{mmrr}+AREA_{mrrm})\cdot 100$ The $^{13}$C-NMR analysis was performed using a 400 MHz Bruker NMR spectrometer under conditions such that the signal intensity in the spectrum was directly proportional to the total number of contributing carbon atoms in the sample. Such conditions are well known to the skilled person and include for example sufficient relaxation time etc. In practice the intensity of a signal is obtained from its integral, i.e. the corresponding area. The data was acquired using proton decoupling, 4000 scans per spectrum, a pulse repetition delay of 20 seconds and a spectral width of 26000 Hz. The sample was prepared by dissolving a sufficient amount of polymer in 1,2,4-trichlorobenzene (TCB, 99%, spectroscopic grade) at 130° C. and occasional agitation to homogenize the sample, followed by the addition of benzene-$d_6$ ($C_6D_6$, spectroscopic grade) and a minor amount of hexamethyldisiloxane (HMDS, 99.5+%), with HMDS serving as internal standard. To give an example, about 200 mg of polymer were dissolved in 2.0 ml of TCB, followed by addition of 0.5 ml of $C_6D_6$ and 2 to 3 drops of HMDS. Following data acquisition the chemical shifts are referenced to the signal of the internal standard HMDS, which is assigned a value of 2.03 ppm.

Tensile strength and elongation of the nonwovens were measured according to ISO 9073-3:1989.

In order to illustrate the advantages of the present invention a total of four polypropylenes were selected, of which R1 and R4 served as comparative examples. Polypropylene R1 corresponds to a typical polypropylene spunbond grade, which was produced using a Ziegler-Natta catalyst with a phthalate as internal donor. R1 is visbroken with a degradation ratio of about 6. Polypropylene R2 was an ex-reactor resin prepared with a Ziegler-Natta catalyst with a succinate as internal donor. Polypropylene R3 was an ex-reactor resin prepared with a Ziegler-Natta catalyst with a succinate as internal donor, the ex-reactor resin being degraded to a final melt flow index of 25 dg/min with a degradation ratio comparable to that of R1. Polypropylene R4 was an ex-reactor resin prepared with a Ziegler-Natta catalyst with a diether as internal donor instead of a succinate. Polypropylene properties are given in Table I.

All polypropylenes were additivated with the same standard package of additives.

TABLE I

|  | R1 | R2 | R3 | R4 |
| --- | --- | --- | --- | --- |
| MFI (dg/min) | 25 | 25 | 25 | 25 |
| Xylene sol. (wt %) | 3.4 | 4.5 | 3.4 | not measured |
| Mn/Mw/Mz (kg/mol) | 41/164/429 | 25/253/1231 | 34/169/533 | 28/201/761 |
| D/D' | 4.0/2.6 | 10.0/4.9 | 4.9/3.1 | 7.1/3.8 |
| mmmm (%) | 97.1 | 97.7 | 97.6 | not measured |

Fibres were prepared on a Busschaert fiber spinning line equipped with two circular dies of 112 holes each, each hole having a diameter of 0.5 mm.. Spinning was carried out at a temperature of 250 ° C. at a rate of 0.5 g/hole/min. 3.8 dtex fibres were produced at a speed of 1300 m/min. No additional drawing step was performed. The mechanical properties of the fibres are summarised in Table II.

TABLE II

|  | R1 | R2 | R3 | R4 |
| --- | --- | --- | --- | --- |
| Titre (dtex) | 3.79 | 3.82 | 3.83 | 3.0 |
| Tenacity at max. (cN/tex) | 21 | 10 | 18.1 | 13.5 |
| Elong. at break (%) | 234 | 580 | 287 | 410 |

It can be seen that the fibres according to the present invention R2 display a considerable gain in elongation, by about 150% with respect to reference polypropylene R1 and by about 75% with respect to a comparable ex-reactor Ziegler-Natta polypropylene prepared with a diether internal electron donor, polypropylene R4.

The nonwovens prepared from such fibres also display a substantial gain in extensional capability and they exhibit excellent tear resistance.

The invention claimed is:

1. A process for the production of fibers and filaments comprising:
   (a) polymerizing propylene and one or more optional comonomers in presence of a Ziegler-Natta catalyst and an organoaluminium compound to produce a polypropylene having a molecular weight distribution $M_w/M_n$ of at least 7;
   (b) feeding the polypropylene to an extruder;
   (c) subsequently melt-extruding the polypropylene to obtain a molten polypropylene stream;
   (d) extruding the molten polypropylene stream of step (c) through a number of fine capillaries of a spinneret, thus obtaining filaments of molten polypropylene; and
   (e) subsequently reducing the diameter of the filaments obtained in the previous step to a final diameter, wherein the polypropylene produced in step (a) is either a propylene homopolymer or a random copolymer of propylene with one or more comonomers, said comonomers being ethylene or a $C_4$-$C_{10}$ alpha-olefin, said random copolymer comprising up to 6% by weight of comonomer, relative to the total weight of the random copolymer; and wherein the Ziegler-Natta catalyst comprises a titanium compound, which has at least one titanium-halogen bond, and an internal donor, both supported on a magnesium halide in active form, with the internal donor comprising at least 80 wt %, with respect to the total weight of the internal donor, wherein the internal donor is a di-ketone or a enamino-imine.

2. The process of claim 1, wherein the polypropylene has an isotacticity of at least 97%, as measured by mmmm pentads determined by $^{13}$C-NMR analysis.

3. The process of claim 1, wherein in step (a) propylene and one or more optional comonomers are polymerized in further presence of an external electron donor.

4. The process of claim 1 further comprising:
   (a1) thermally or chemically degrading the polypropylene produced in step (a) from a first melt flow index $MFI_1$ to a second melt flow index $MFI_2$, such that the ratio of first to second melt flow index, $MFI_2/MFI_1$, is at least 2, with the melt flow index being measured according to ISO 1133 at 230° C. and 2.16 kg.

5. The process of claim 4, wherein the polypropylene is thermally degraded.

6. The process of claim 4, wherein the polypropylene is chemically degraded by bringing the polypropylene into contact with a peroxide.

7. The process of claim 1, wherein the filaments obtained in step (e) are not subjected to a further drawing step.

8. The process of claim 1, further comprising:
   (f) collecting the filaments obtained in step (e) on a support: and
   (g) subsequently bonding the collected filaments to form a bonded nonwoven.

9. The process of claim 8 further comprising:
   (h) laminating a film to the bonded nonwoven obtained in step (g).

10. The process of claim 8, wherein the nonwoven is a spunbond nonwoven.

* * * * *